(12) United States Patent
Jancourtz (10) Patent No.: US 8,909,035 B2
(45) Date of Patent: Dec. 9, 2014

(54) PHOTOGRAPHY STAND

(76) Inventor: Joshua Morgan Jancourtz, Mountainside, NJ (US)

( * ) Notice: Subject to any disclaimer, the term of this patent is extended or adjusted under 35 U.S.C. 154(b) by 57 days.

(21) Appl. No.: 13/422,186

(22) Filed: Mar. 16, 2012

(65) Prior Publication Data

US 2012/0177350 A1  Jul. 12, 2012

Related U.S. Application Data

(63) Continuation-in-part of application No. PCT/US2010/049344, filed on Sep. 17, 2010.

(60) Provisional application No. 61/276,888, filed on Sep. 17, 2009.

(51) Int. Cl.
*G03B 15/00* (2006.01)
*F16M 11/08* (2006.01)

(52) U.S. Cl.
CPC ............ *G03B 15/00* (2013.01); *F16M 11/08* (2013.01)
USPC ........................................... 396/5; 248/123.2

(58) Field of Classification Search
CPC ............................... F16M 11/08; F16M 11/12

USPC .......................................... 396/5; 248/123.2
See application file for complete search history.

(56) References Cited

U.S. PATENT DOCUMENTS

| 4,575,215 A | 3/1986 | Ariyama et al. |
| 5,857,119 A * | 1/1999 | Borden ............................. 396/5 |
| 6,549,726 B2 | 4/2003 | Huebner |
| 6,969,033 B2 * | 11/2005 | van der Linden .......... 248/177.1 |
| 2001/0041064 A1 * | 11/2001 | Huebner ........................... 396/3 |
| 2005/0195216 A1 * | 9/2005 | Kramer et al. ................. 345/619 |
| 2007/0172216 A1 | 7/2007 | Lai |
| 2011/0069880 A1 * | 3/2011 | Sergieiev ...................... 382/154 |

* cited by examiner

Primary Examiner — Clayton E Laballe
Assistant Examiner — Linda B Smith
(74) Attorney, Agent, or Firm — Stroock & Stroock & Lavan LLP (57) ABSTRACT

An apparatus comprising a platform with a center area and a platform support structure rotatively supporting said platform from outside a safe area adjacent to a plane through said platform's rotational axis whereby an image capture device may be positioned longitudinally throughout a range of angles within the safe area about a subject placed on said platform's center area such that the platform support structure will not substantially interfere visually with the imaging of the subject by appearing in said image capture device's field of view in front of or behind the subject.

28 Claims, 11 Drawing Sheets

PHOTOGRAPHY STAND

CROSS REFERENCE TO RELATED APPLICATIONS

The present application is a continuation-in-part of Patent Cooperation Treaty (PCT) International Application Serial No. PCT/US2010/049344 filed on Sep. 17, 2010, which claims the benefit of priority to U.S. Provisional Application Ser. No. 61/276,888 filed on Sep. 17, 2009, the entirety of both disclosures being incorporated by reference herein.

FIELD OF THE INVENTION

The present invention relates to a physical support structure for use in multi-angle imaging and surface contour data collection of three dimensional objects.

STATEMENT OF THE PROBLEM

Studio photography requires a precisely controlled photographic environment in order to achieve consistent and acceptable results in photographing items for use in advertisements, Web sites, and other display media. This is especially true with regard to certain types of product photography wherein multiple angles of a particular item are captured for use in providing an interactive display to exhibit multiple views of a particular product. In an interactive multi-angle display, a user may typically be able to adjust an image such that the item can be viewed from multiple angles. In this type of product photography it is important that images of multiple angles be captured precisely with little or no variation in lighting exposure, the manner in which light is perceived to fall on the subject, background appearance, apparent distance of the subject, and centering of the subject within the image frame. Uniformity is required so that the multiple images can be combined to form a single interactive "3-D" display that a user can manipulate to view the subject from all angles. In a typical product photography setup using one or more lights, reflectors, diffusers, gobos or other studio lighting equipment, it is necessary to manually move a product relative to a camera to capture multiple angle images and it may also be necessary to move elements of the lighting setup in order to achieve consistent results. This can require much painstaking work, requiring adjustments to camera settings and position, light orientation and background adjustments to ensure uniformity for all images.

It is also often desirable in studio photography to use a transparent or non-opaque platform in order to use certain lighting techniques, to reveal a background, or to shoot up at a subject through the platform. Attempting to capture multi-angle images when using these types of non-opaque platforms presents significant challenges: using a spindle-based turntable to rotate a subject may be unsatisfactory due to visual interference from a spindle or surrounding rotation mechanism, and manually moving the subject on the platform or moving the platform itself can require much painstaking work in order to achieve consistent results.

U.S. Pat. No. 6,343,184, Huebner discloses a transparent stage rotatably connected to a stage support and a method of moving a camera horizontally and vertically with respect to the stage, however Huebner fails to disclose a stage support that will not be visible either directly in front of or directly behind the central subject placement area of the stage as a camera is rotated longitudinally about the stage within a full or partial range of angles from one pole of the stage's rotational axis to the other. Huebner also discloses a means of raising or lowering a stage in order to align a camera with a subject, but suggests a pedestal embodiment and does not disclose a means of supporting the stage such that use of a transparent stage would be possible without any structural elements of the apparatus being visible either directly in front of or directly behind the central subject placement area of the stage as a camera is rotated longitudinally about the stage within a full or partial range of angles from one pole of the stage's rotational axis to the other.

U.S. Pat. No. 6,969,033, Van Der Linden discloses a camera mount having two support frames which can pivot at right angles to one another, a camera stage, and a turntable which rotates on a meeting point of the axes of the rotation of the two support frames, but Van Der Linden fails to disclose a transparent camera stage as well as a stage support that will not be visible either directly in front of or directly behind the central subject placement area of said stage as a camera is rotated longitudinally about said stage within a full or partial range of angles from one pole of the stage's rotational axis to the other.

Other patents disclose examples of devices with rotatable bases for photography. However, in each of these cases, a spindle or similar apparatus is positioned underneath the support base, greatly hindering the ability to prevent such apparatuses from visually interfering with the image when using a non-opaque platform to hold a subject.

Therefore, what is needed beyond the prior art is an apparatus that allows capturing multi-angle images of a subject from a full range of possible angles or a desired subset of this range without any structural parts of the apparatus visually interfering with a usable image area around the subject, even when using a non-opaque or transparent platform. In addition, there is a need for an apparatus that provides a means of capturing these multi-angle images of a subject precisely, predictably and with little or no variation in lighting exposure, the manner in which light is perceived to fall on the subject, background appearance, apparent distance of the subject, and centering of the subject within the image frame; and more desirably that can do so in an automated manner, thus alleviating much of the painstaking and time consuming manual labor associated with multi-angle product photography.

SUMMARY OF THE INVENTION

The present invention therefore provides an apparatus for multi-angle imaging comprising a transparent platform with a center area to support a subject and a platform support structure that rotatively supports the platform outside its center area such that a camera may be positioned longitudinally around the platform without the platform support structure visually interfering with the image around the subject. Some embodiments allow for the support structure to be present below the platform on the side of the platform's rotational axis where a camera will be placed so that there will be no visual interference from the support structure behind or in front of the subject as long as the camera is placed above the platform surface.

In one embodiment the present inventor provides a support structure for holding and moving a subject for imaging with an imaging device having a field of view including a platform having a center area for placement of the subject and an axis about which the platform rotates; and a platform support structure for supporting and rotating the platform, wherein the platform support structure is configured and arranged so that it does not substantially interfere with the imaging of the subject by appearing in the field of view when the image capture device is positioned throughout a range of angles in a plane through the rotational axis of the platform. The platform may further include a peripheral area and the platform support structure preferably supports the platform in the peripheral area.

In one embodiment the image capture device may be positioned in a range of angles in the plane through the rotational axis of the subject that is greater than about 75 degrees without the platform support structure appearing in the field of view of the image capture device. In another embodiment, the image capture device may be positioned in a range of angles in the plane through the rotational axis of the subject that is greater than about 90 degrees without the platform support structure appearing in the field of view of the image capture device. In another embodiment, the image capture device may be positioned in a range of angles in the plane through the rotational axis of the subject that is greater than about 180 degrees without the platform support structure appearing in the field of view of the image capture device. In another embodiment, the image capture device may be positioned in a range of angles in the plane through the rotational axis of the subject that is greater than about 270 degrees without the platform support structure appearing in the field of view of the image capture device. In another embodiment, the image capture device may be positioned in a range of angles in the plane through the rotational axis of the subject that is about 360 degrees without the platform support structure appearing in the field of view of the image capture device.

In one embodiment, the platform preferably is circular, transparent and rotatable about its center point. The platform may be configured and adapted to translate vertically. The platform also may be circular with a grooved edge. The platform support structure preferably supports the platform with at least one of rollers, roller bearings, ball bearings, belts, chains, timing belts, timing belt pulleys, tracks, treads, gears, sprockets, air pressure, or magnetic force. The platform may be rotated by an electrically operated motor system or manual crank system.

The support structure in a further embodiment may optionally include a device mount assembly rotatable longitudinally about the platform, wherein the device mount supports at least one of the group consisting of the image capture device, a lighting system, a filter system, and a background set-up system. The device mount assembly may be configured and adapted to rotate 360 degrees about the platform. The device mount assembly may be configured and adapted to translate vertically. The device mount assembly may be rotated by an electrically operated motor system or a manual crank system. The device mount may include at least one pivoting arm and the length of the at least one pivoting arm may be variable by a telescoping mechanism.

The support structure in another embodiment may include a platform, the platform having a center area for placement of the subject and a rotational axis (for example, a vertical axis perpendicular to the surface of the platform and extending through the center point of the platform), a platform support structure for supporting the platform, and a device mount for the image capture device, wherein the support structure is configured and arranged to rotate either the platform or the device mount about the rotational axis of the platform without the other of the platform and the device mount rotating, and without the structural support substantially interfering with the imaging of the subject by appearing in the field of view when the image capture device is positioned throughout a plane through the rotational axis of the platform.

Additionally or alternatively, the support structure may be configured and arranged to independently rotate the platform and the device mount about the rotational axis of the platform, or rotate the device mount and/or the support structure and device mount about the rotational axis of the platform, while the platform remains stationary. As disclosed in these and other exemplary embodiments, the device mount may be rotatable longitudinally and laterally about the platform, without the structural support substantially interfering with the imaging of the subject by appearing in the field of view when the image capture device is positioned throughout a plane through the rotational axis of the platform and about the rotational axis of the platform.

The support structure in yet another embodiment may include an optional computer control system, wherein the computer control system controls rotation of the platform and the triggering of the image capture device. The computer control system also may control the rotation of the device mount assembly, the rotation of the platform, and the triggering of the image capture device.

The support structure in another embodiment may have a safe area defined as a plane through the rotational axis of the platform and an image capture device having a field of view is positionable throughout a range of angles within the safe area about the platform's center area such that the support structure will not substantially interfere visually with the imaging by appearing in the field of view in front of or behind the subject. The safe area may be substantially constrained within the range of positions of the imaging device and the background and any area outside the imaging device's field of view throughout the range of angles. In another embodiment an image device position area may be defined as the area above the platform on one side of the platform's rotational axis and the safe area may substantially exclude the area below the platform on the side of the image device position area and the area above the platform on the side opposite the image device position area.

In yet another embodiment a support structure for holding and moving a subject for imaging with an imaging device is provided that includes a platform having a center area for placement of the subject and a peripheral area; a camera positioning area defined as a plane through the platform's rotational axis where the imaging device may be positioned; and a platform support structure rotatively supporting the platform in its peripheral area outside an area defined by the intersection of the platform with the camera positioning area on at least one side of the platform's rotational axis.

The multi-angle imaging apparatus in yet another embodiment may comprise a platform with a center area and a platform support structure rotatively supporting said platform from outside an imaginary safe area adjacent to a plane through said platform's rotational axis whereby an image capture device may be positioned longitudinally throughout a range of angles within said safe area about a subject placed on said platform's center area such that said platform support structure will not substantially interfere visually with the imaging of the subject by appearing in said image capture device's field of view in front of or behind said subject.

The present invention also preferably provides an optional device mount assembly rotatable longitudinally about the subject support platform providing a means to support a camera, elements of a lighting setup, and a background. The device mount assembly comprises at least one pivoting arm attached to a base or to the platform support structure wherein the device mount assembly may be positioned longitudinally within a range of angles about the subject support platform.

In another embodiment a structure for supporting an image capture device is provided that includes a base with a device mount assembly for carrying the image capture device attached to the base by at least one pivoting arm and a subject support platform wherein the device mount assembly may be positioned within a range of orientations about the subject support platform such that the only part of the structure for supporting an image capture device within the field of view of the image capture device is the subject support platform.

The apparatus therefore provides a "safe zone" adjacent to a plane through the platform's rotational axis where a camera may be placed and aimed at a subject so that the camera's field of view may comfortably fit the subject without visually interfering in a "usable image area" around a subject either in front of or behind the subject. This method allows the resulting image to be cropped as desired so that it includes the subject but not the platform structure. A "safe zone" may therefore be defined as the collection of "usable image areas" throughout a range of angles.

To center the subject as desired throughout a range of longitudinal angles, the rotational axis of the device mount assembly can be adjusted with respect to the platform via linear actuators attached to the platform support structure. The capturing of multi-angle images may be automated via computer control of a camera and stepper motors attached to the rotating mechanisms of the platform and device mount assembly.

In another embodiment the structure for supporting an image capture device is provided wherein the device mount assembly may be moved in rotation about said subject support platform. The device mount assembly may be attached to at least one pivoting arm with a revolving mount. The subject support platform may be circular and preferably is rotatable about its center point. The subject platform may have a textured or roughened area, or a groove along its edge or periphery which may assist with rotating the platform. The subject support platform may be transparent, semi transparent or opaque. In addition, the support platform preferably may translate vertically and may preferably be supported at its circumference by rollers, by roller bearings or by ball bearings. The support platform may be supported at its circumference by air pressure and/or by a magnetic force. In yet another embodiment the subject support platform may be rotated by an electrically operated by a motor system, for example a friction drive motor and/or stepper motor.

The at least one pivoting arm in a preferred embodiment may be pivoted through a range of angles, including for example, 90 degrees, 180 degrees, or 360 degrees, by a manually operated crank and gear system, or an electrically operated motor system, for example a stepper or friction drive motor. The structure for supporting an image capture device and subject may further include a computer control system for controlling the electrically operated motor system and electrically operated drive motor system and the image capture device. In addition, the at least one pivoting arm length may be varied by a telescoping mechanism.

BRIEF DESCRIPTION OF THE DRAWINGS

The foregoing summary, as well as the following detailed description of the preferred embodiments of the application, will be better understood when read in conjunction with the appended drawings. For the purposes of illustrating the device, system, instrumentation and method of the present application, there are shown in the drawings preferred embodiments and techniques. It should be understood, however, that the application is not limited to the precise arrangements, structures, features, embodiments, aspects, instrumentalities and techniques shown, and that the arrangements, structures, features, embodiments, aspects, instrumentalities and techniques disclosed herein may be used singularly or in combination with other arrangements, structures, features, embodiments, aspects, instrumentalities and techniques. The same reference number represents the same element or same type of element on all drawings. In the drawings.

DESCRIPTION OF THE PREFERRED EMBODIMENT OF THE INVENTION

Figure 1:
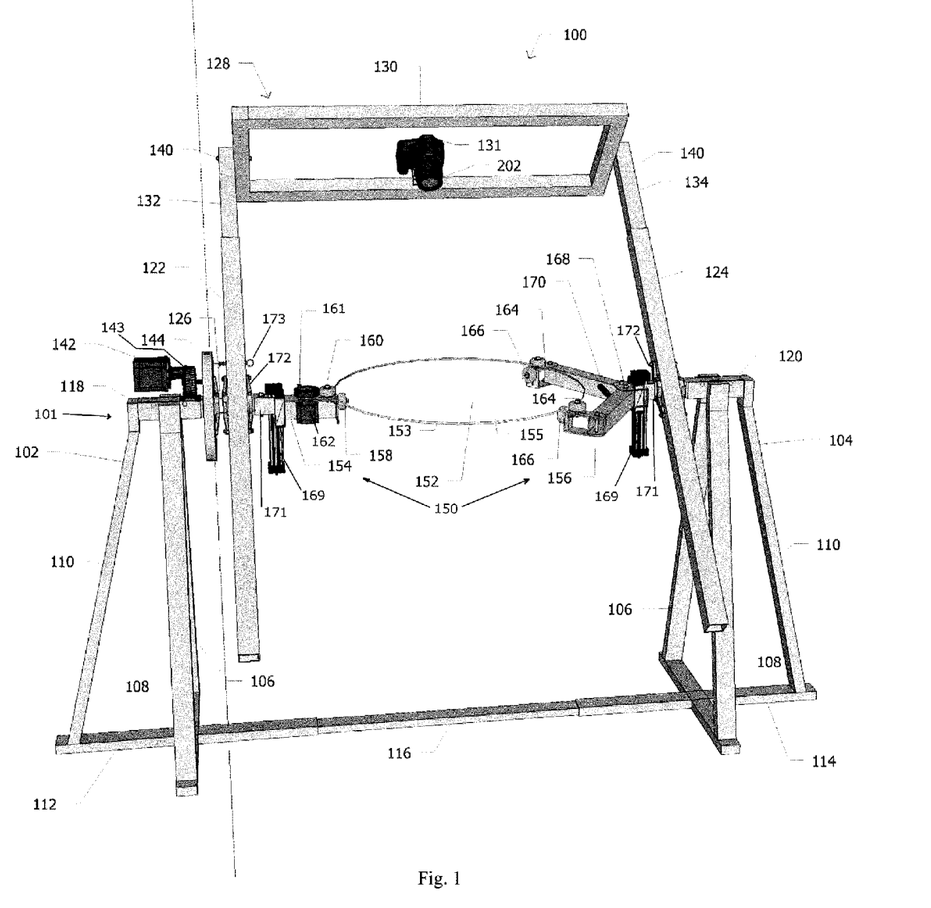
FIG. 1 is a front perspective view of an image capture support structure in accordance with the present invention.

Referring initially to FIG. 1 shows a front view of the product photography structure 100 according to the present invention. The structure includes several major subassemblies which shall be described in turn.

Platform support structure 101 comprises a base subassembly and subject platform subassembly. The base subassembly includes a first 102 and second 104 leg support. The leg support as depicted includes three triangulated leg stanchions 106, 108 and 110, connected to cross members 112 and 114 respectively. Cross members 112 and 114 are depicted as being connected by bracket 116 although bracket 116 is not a necessary part of the base subassembly and may be removed without compromising the stability, strength or purpose of the structure. In addition, while the base subassembly is described as having a particular arrangement of leg stanchions and cross members, such arrangement is not required for the operation and purpose of the present invention. Other suitable arrangements for providing a stable and secure base are contemplated within the scope of this invention as would be apparent to one skilled in the art.

The base subassembly further includes top supports 118 and 120, which form the cap of leg stanchions 106, 108 and 110 and provide a mounting point for the other subassemblies of the present invention as will be further shown and described herein.

Turning again to FIG. 1 there is also depicted subject platform subassembly 150, which supports platform 152 and comprises supports 154 and 156. Platform 152 is preferably a rigid flat round transparent surface for supporting a subject. The platform may be made of glass, or other rigid transparent materials such as plexiglass or lexan. The platform 152 may be of a glossy or non-glare surface depending on the needs of the photographer. In addition, it is within the scope of the invention that the platform may also be a uniform color non-transparent surface or an opaque surface. The platform may be changed with a platform of any desired material.

Figure 3:
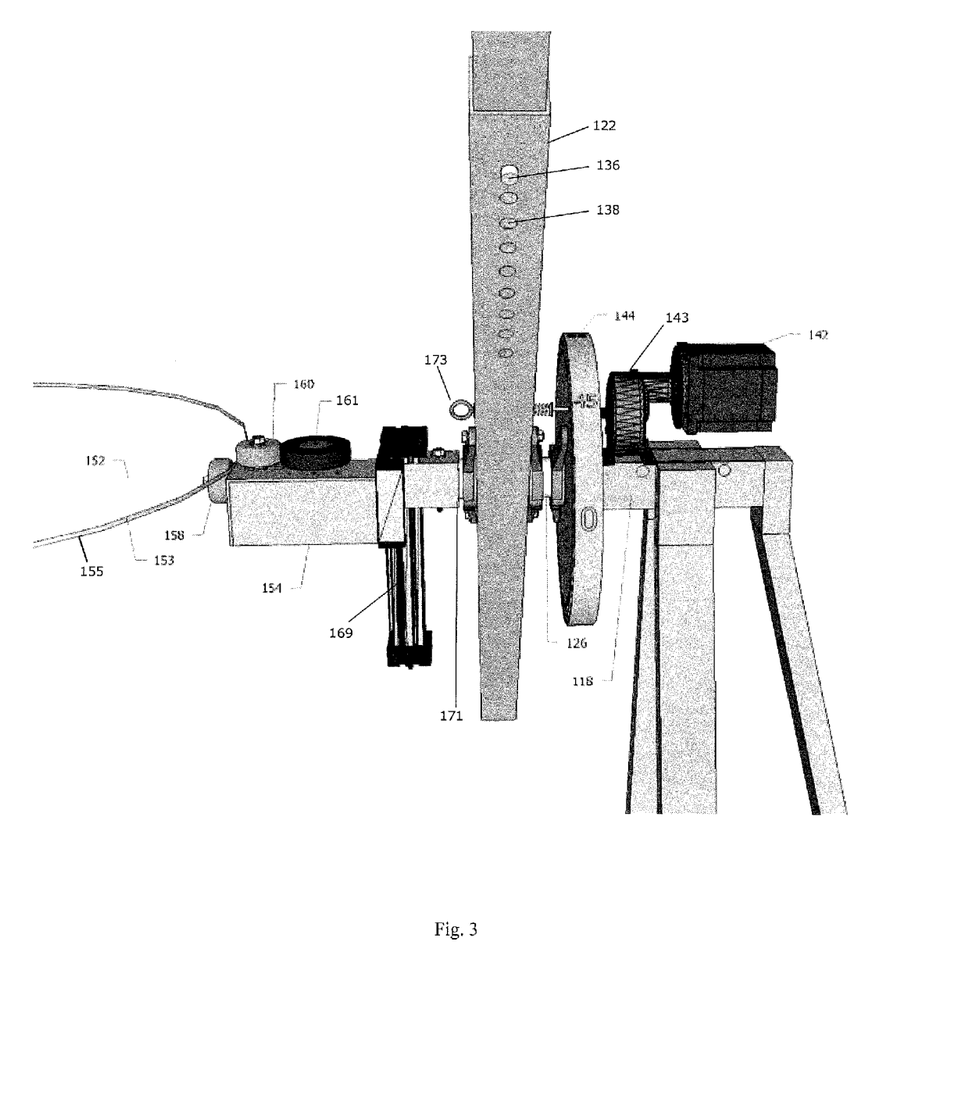
FIG. 3 is a detail view of the image capture support structure camera mount and platten drive system.
Figure 4:
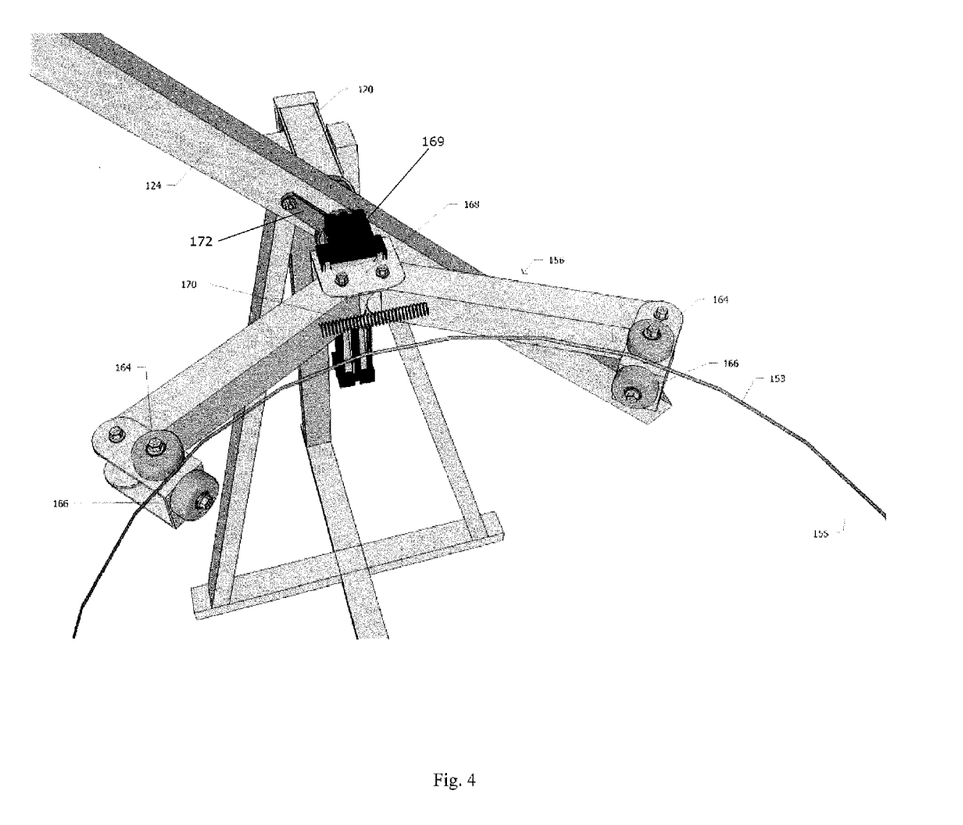
FIG. 4 is a detail side view of the image capture structure platform support device.

As will be more clearly shown and described with respect to FIGS. 3 and 4, platform 152 is supported by supports 154 and 156. Support 154 includes a vertical roller 158 and a horizontal roller 160. The bottom surface 155 of platform 152 rests freely upon vertical roller 158, which provides on contact point for supporting platform 152. Roller 158 rotates about a spindle and may be made of a variety of materials for securely supporting platform 152. Horizontal roller 160 contacts the side edge 153 of platform 152 and stepper motor 162 (seen in FIG. 1) that is mounted between rotating arms 132 and 134. Stepper motor 162 is operatively connected to platform 152 by horizontal roller 160 that transmits the rotational power of stepper motor 162 to platform 152. Stepper motor 162 may be operatively connected to platform 152 by a friction drive wheel 161, which transmits power through horizontal roller 160, although other alternative arrangements are possible within the scope of this invention. For example a horizontal platen drive wheel may be connected to a stepper motor and used to transmit rotational power to platform 152.

As will be further explained hereinafter stepper motor 162 may be connected to a computer based control system for controlling the rotation of platform 152, thereby controlling the position of the subject placed thereon for automating the product photography process in conjunction with the use of the product photography structure according to the present invention.

Subassembly 150 further includes supports 156 seen in FIG. 4. Supports 156 include horizontal rollers 164 and vertical rollers 166. Horizontal rollers 164 are in contact with side edge 153 of platform 152 and exert a force against side edge 153. The force exerted by horizontal rollers 164 is sufficient to keep platform 152 in contact with horizontal roller 160 but will not prevent platform 152 from rotating on vertical rollers 158 and 166 in response to power exerted on platform 152 from stepper motor 162. The bottom surface 155 of platform 152 contacts vertical rollers 166 which together with vertical roller 158 provide stable support for platform 152. As with vertical roller 158, rollers 166 rotate freely to allow platform 152 to rotate in response to power exerted by stepper motor 162.

Rollers 164 and 166 are mounted on supports 156. Supports 156 comprise articulating arms, which pivot about attachment points on bracket 168. Bracket 168 is rigidly affixed to the sliding part of a linear actuator 169, and the fixed part of the actuator is attached to fixed tube support 171 (not shown in FIG. 4), which is in turn fixed to top support 120. Supports 156 are held biased toward each other by the force of a spring 170 attached to the inside of each support. One arm may be fixed while the other is allowed to move. In this way rollers 164 push against platform side edge 153.

While the platform support structure is depicted and described herein as utilizing rollers, alternate support devices are possible and consistent with the present invention. For example any type of bearing system known to one skilled in the art may be utilized to facilitate rotation of the platform 152. Such bearings may include roller bearings or ball bearings. Additionally, other devices such as an air pressure system or magnetic suspension or maglev system may be employed.

In the case of an air pressure system, a conduit for carrying pressurized air may be placed below the platform 152. Apertures may then be placed in the conduit in order to direct air of sufficient force towards the bottom of platform 152 in order to support said platform. Alternately, a maglev system could also be employed wherein a set of magnet pairs are mechanically constrained along a single vertical axis, with one magnet of each pair affixed to platform 152 and the other magnet of each pair affixed to the support structure for example, and arranged to repel each other strongly, this will act to levitate one of the magnets above the other and thus levitate platform 152.

Also depicted in FIG. 1 are linear actuators 169. Linear actuators are attached to the areas of platform support structure 150 that make contact with platform 152 and in this embodiment are supported by support structures 118 and 120 via fixed tube supports 171. The linear actuators may be used to translate platform 152 in a vertical direction through a predetermined range of motion. This allows for positioning of the platform 152 relative to the rotational axis of the camera so that subjects of varying height may appear acceptably centered within the image frame at varying angles. The linear actuators may be manually actuated by a hand crank or other acceptable device known in the art for transferring force to impart linear motion or may be connected to a motorized device, which as will be further explained hereinafter, is controlled by an automated computer controlled image capture software program in connection with the stepper motors and camera shutter control.

Alternatively, linear actuators 169 may be connected to tube supports 171 and supports 154 and 156 via a pair of rotatable attachments (not shown). The rotatable attachments would allow the linear actuators to be actuated in a horizontal or diagonal direction, in addition to the vertical direction, to aid in centering the subject. The rotatable attachments may be manually actuated by a hand crank or other acceptable device known in the art for transferring force to impart circular motion or may be connected to a motorized device, which, like the other motors, is controlled by an automated computer controlled image capture software program in connection with the motors and camera shutter control.

Figure 1A:
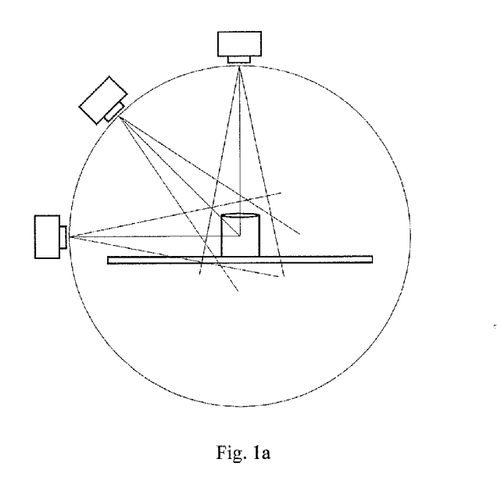
FIG. 1a is diagram depicting the image capture device positioning according to the present invention.

FIG. 1a shows how adjusting the rotational axis of a camera around a subject to approximately half the height of the subject can help keep the subject centered within the image at varying angles.

Turning again to FIG. 1, there is also depicted device mount assembly 128. The device mount assembly is comprised of pivoting arms 122 and 124. Pivoting arms 122 and 124 are mounted on bearings 172 which rotate on axle 126. The device mount assembly is connected via spring biased pin 173 to gearbox 144, which is in turn connected to gear reducer 143, which is in turn connected to stepper motor 142. Gear reducer 143 is mounted upon top support 118. It should be further noted that while the present invention is shown and described as having two pivoting arms 122 and 124, the present invention is not so limited and may be constructed so as to comprise a single pivoting arm. Also, other such arrangements and connections for stepper motor are possible within the scope of this invention. The stepper motor may be connected in any way to enable precise rotational control of rotating arms 122 and 124.

Figure 5:
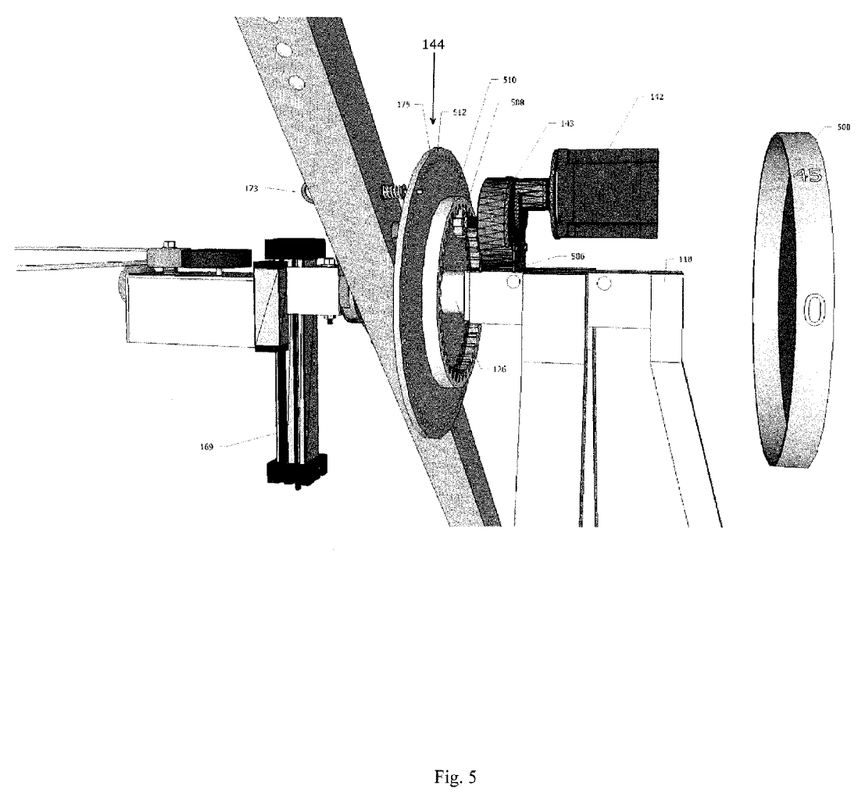
FIG. 5 is a detailed view of the drive motor arrangement in accordance with the present invention.

The device mount assembly further comprises rectangular frame 130, mounted between to extension supports 132 and 134, which are attached to pivoting arms 122 and 124. Extension supports 132 and 134 may be attached to pivoting arms 122 and 124 by sliding the extension supports within the pivoting arms in a telescoping manner. The extension supports may then be held in place by a spring-loaded button 136 which protrude through holes 138 in pivot arms 122 and 124 as shown in FIG. 3. In this way the extension supports may be inserted within pivot arms 122 and 124 to a predetermined depth, and thus vary the focal distance from the camera to the subject to account for varying subject size, shape, lighting considerations and the like. In addition, it should be noted that pivot arms 122 and 124 are adapted to receive extension arms into either end as shown in FIG. 1. In this way, a second device mount assembly may be attached to the pivoting arms 122 and 124. The second device mount, not shown, may be used for attaching a backdrop, lighting or other devices useful for product photography. Any other elements of a lighting setup, including framework to hold these elements, may be attached to any structural piece connected to and rotating with pivoting arms 122 and 124. Pivoting arms may be connected to stepper motor drive system by a spring biased pin 173, which is mounted on pivot arm 122 and may be extended to fit into apertures in gearbox 144 side plate 175 seen in FIG. 5. The spring bias pin may be extended or retracted as needed in order to allow or prevent rotation of pivot arms 118 and 120. As shown in FIG. 5, the cover 500 of gearbox 144 may include markings to indicate to the user the angular displacement of the pivot arms 118 and 120 relative to a predetermined datum plane, such as for example a level horizontal plane.

Rectangular frame 130 is adapted to receive a variety of photographic equipment utilizing typical camera mount devices such as a ball head or flash, diffuser or lighting mount. As is shown and described more fully hereinafter, the camera mount may be attached to the frame 130, by a threaded rod or insert. The frame 130 may be adapted to receive multiple inserts so as to accept multiple devices thereon. In the embodiment depicted a camera 131 is shown mounted to frame 130. The camera may be manually operated or operated as part of any automated control system as will be further described herein.

Frame 130 is attached to extension supports 132 and 134 utilizing a revolving fixture, 140 such that frame 130 can be turned with respect to extension arms 132 and 134. The revolving fixture may be of any type know in the art and may include a ratcheting, friction fit, or locking mechanism so that frame 130 may be held in a specific orientation with respect to extension arms 132 and 134. In this way a camera for example can be mounted on frame 130 and not only rotated about the subject by moving pivot arms 122 and 124, but also revolved about revolving fixture 140.

Figure 2:
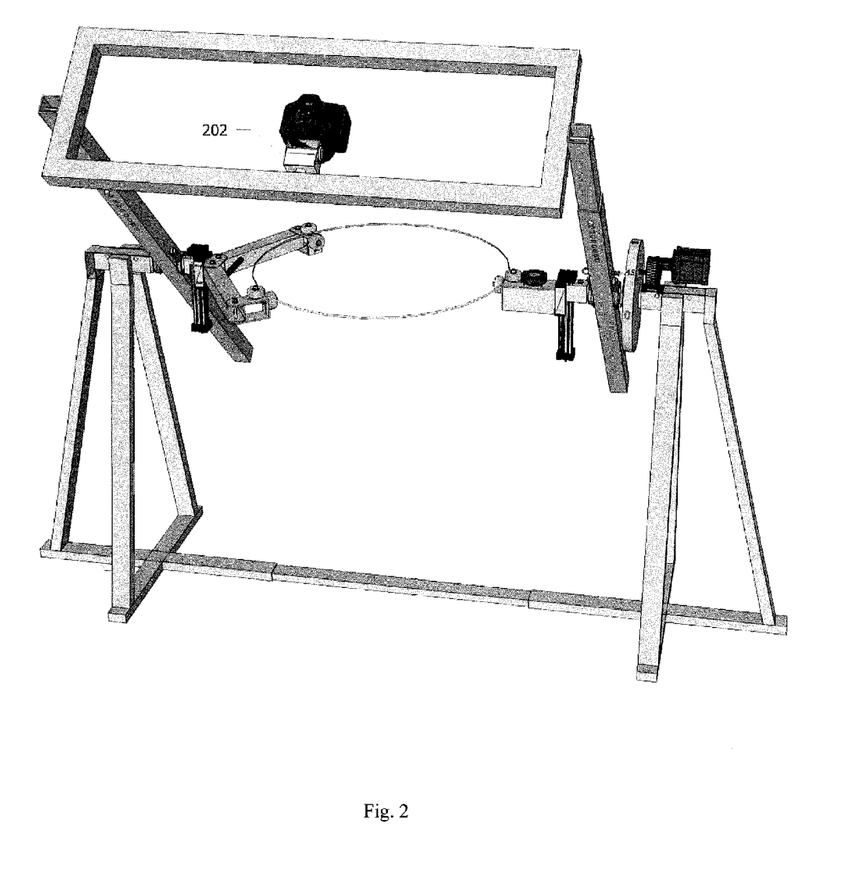
FIG. 2 is a rear perspective view of an image capture support structure in accordance with the present invention.

Turning now to FIG. 2, there is shown a rear perspective view of the product photography structure 100 according to the present invention. In this view the rear of frame 130 is depicted, showing camera 131 attached to frame 130 using a camera mount device 202. As previously stated the camera mount may include any typical camera mount devices such as a ball head or other rigid mount device.

Turning again to FIG. 1, the device mount assembly further includes a stepper motor 142. As is well known in the art, a stepper motor is an electromechanical device, which converts electrical pulses into discrete mechanical movements. The shaft or spindle of a stepper motor rotates in discrete step increments when electrical command pulses are applied to it in the proper sequence. The motors rotation has several direct relationships to these applied input pulses. The sequence of the applied pulses is directly related to the direction of the motor shaft's rotation. The speed of the motor shaft's rotation is directly related to the frequency of the input pulses and the length of rotation is directly related to the number of input pulses applied.

Turning now to FIG. 3, there is shown a close up view of a portion of the product photography structure 100 according to the present invention. Shown in FIG. 3 is a portion of the device mount assembly further includes a stepper motor 142. In this depiction, stepper motor 142 is attached to a gear reducer that is in turn attached to top support 118 although alternate mounting points, such as top support 120 are possible and within the scope of the present invention. As will be further explained hereinafter, the stepper motor 142 may be connected to a computer based control system for controlling the rotation of rotating arms 122 and 124, thereby controlling the position of camera 131 for automating the product photography process in conjunction with the use of the product photography structure according to the present invention.

Stepper motor 142 may be operatively connected to rotating arms 132 and 134 through axle 126 using a gearbox 144, although other such arrangements and connections for stepper motor are possible within the scope of this invention. The stepper motor may be connected in any way to enable precise rotational control of rotating arms 122 and 124. Alternatively, any of the stepper motors may be replaced with hand cranks for manual control.

Turning now to FIG. 5, there is a detail view of the stepper motor and gearbox arrangement depicted in FIG. 1 and FIG. 3. In this view gearbox cover 500 is shown as being removed from gearbox 144 to expose the internal gearbox components. Stepper motor 142 output shaft is connected to gear reducer 143. The gear reducer 143 is rigidly connected to support 118 by brackets 506 and is operatively connected to planetary gearbox 144 through its output shaft and planetary gear 508. Planetary gear 508 is operatively connected to internal ring gear 510. Gearbox sideplate 175 includes apertures 512 for receiving spring biased pin 173 as previously described.

While one pivot arm rail rotates freely, the other has the ability to be fixed in a desired position. In one method, the camera mount rail may be fixed to gearbox side plate 175 plate with holes at an array of angles via a spring biased pin assembly 173. In another method, the plate may also rotate via a bearing block and be connected to a gear reducer via a gearbox. Engaging the gear reducer with a motor or manual crank will rotate the camera mount framework and hold it in position even when the cranking force stops.

Figure 7:
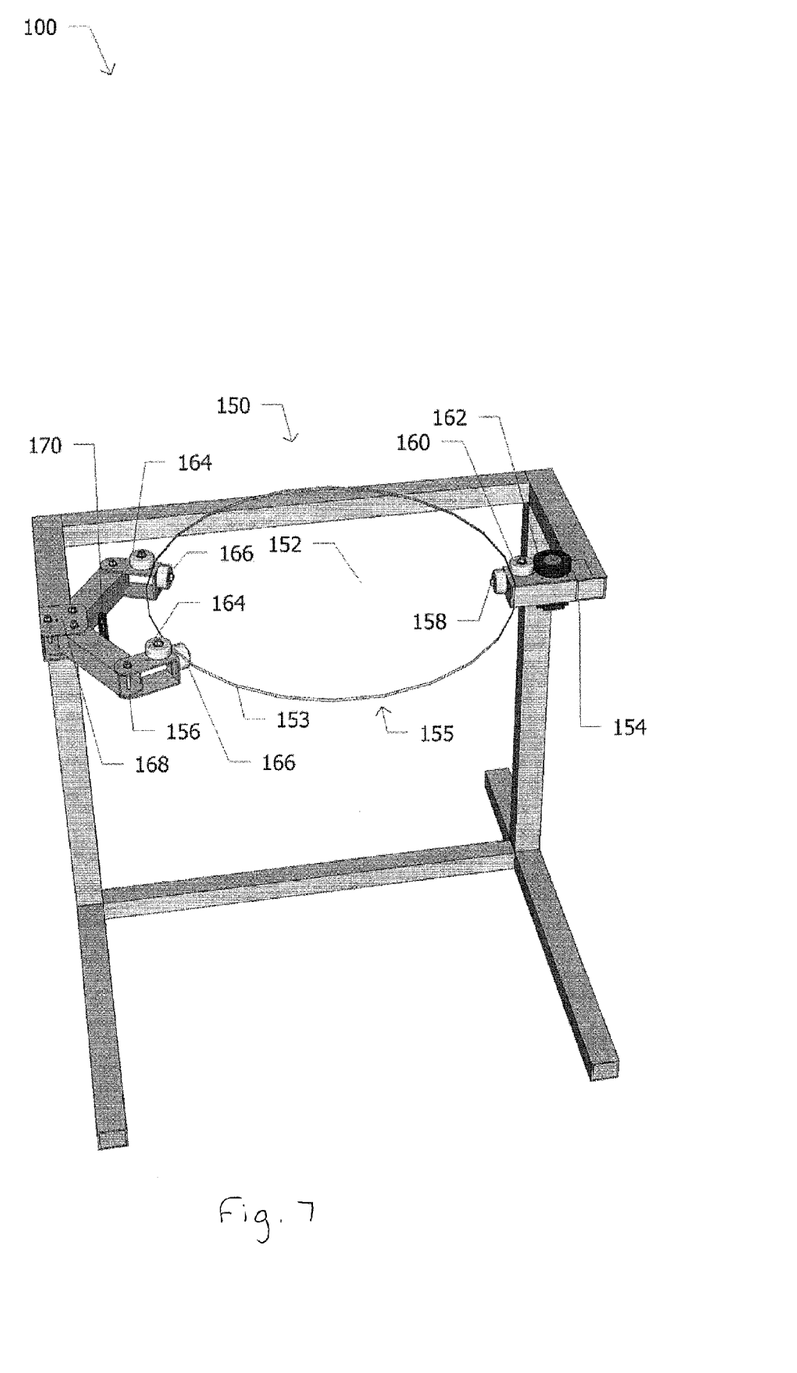
FIG. 7 is a front perspective view of an image capture support structure in accordance with another embodiment of the present invention.
Figure 8:
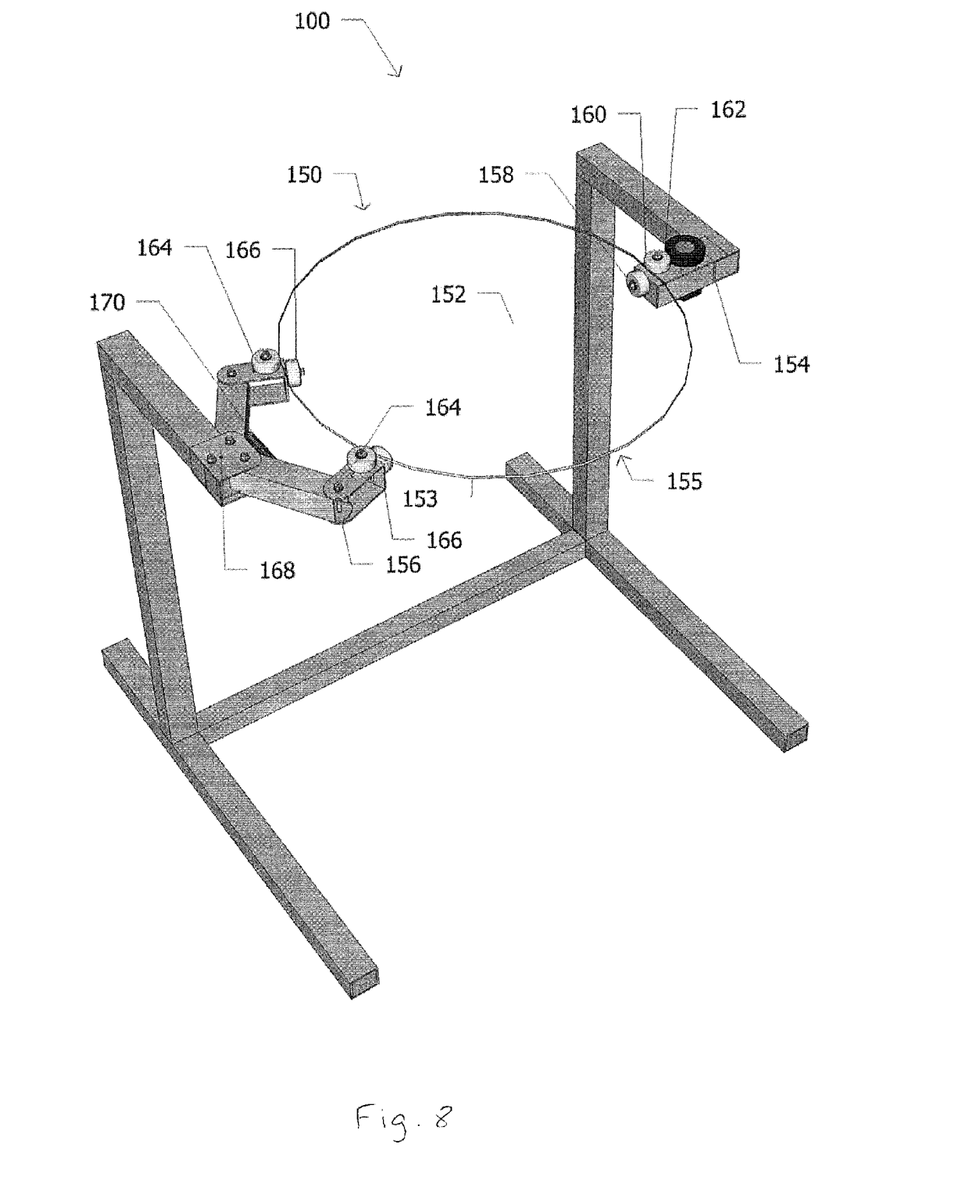
FIG. 8 is a front perspective view of an image capture support structure in accordance with a still further embodiment of the present invention.

FIGS. 7 and 8 show alternative embodiments of a photography stand or support structure 100 without a device mount assembly that is rotatable about the subject support platform 152 and without the linear actuators for vertically adjusting the height of the subject support platform 152.

While in the many embodiments herein the platform is depicted as rotating about its rotational axis while the support structure remains stationary, and the device mount assembly translates only in the vertical plane, one of ordinary skill in the art will understand that alternative embodiments might have the platform and subject remain stationary relative to the support structure and device mount assembly, while the support structure and/or the device mount assembly is rotated about the rotational axis of the platform, and the device mount assembly is rotated throughout a plane through the rotational axis of the platform. Furthermore, the platform may be configured to rotate independently of the other structures.

Figure 6:
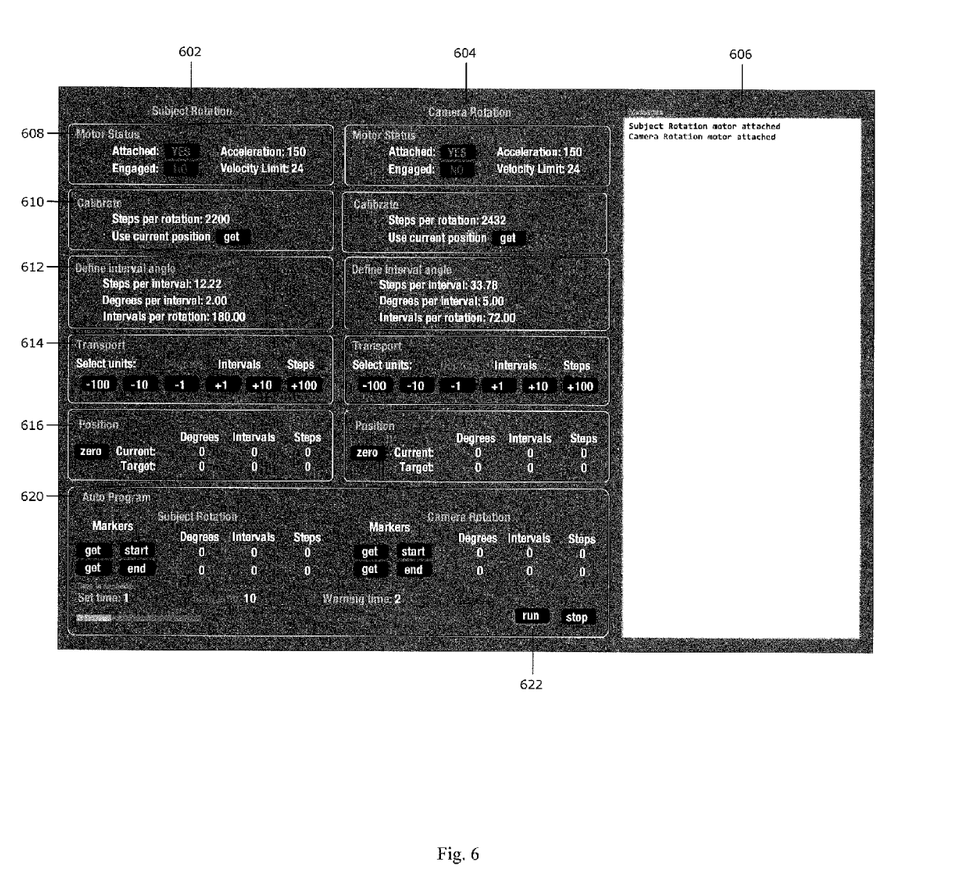
FIG. 6 is an exemplary screenshot of an exemplary user interface for the software controller according to the present invention.

Turning now to FIG. 6, there is shown an exemplary display of a computer operated image capture software for use in accordance with the present invention. As described above, the present invention may be used in connection with an automated computer controlled image capture software program. Such an automated computer controlled image capture software program may control the operation of stepper motors 142 and 162 as well as camera 131 shutter release. The computer control software may be calibrated to control precise rotation of the platform 152 and rotating arms 122 and 124. In this way, a subject may be rotated within the field of view of camera 131 to capture multiple angles of a subject. Once multiple angles of a subject are captured along a particular plane, the computer controller of the present invention may be set to move rotating arms 122 and 124 in order to reposition camera 131 along an alternate plane with reference to subject. Once rotating arms 122 and 124 have repositioned camera 131 along an alternate plane, stepper motor 142 may again be activated by the computer control software to control precise rotation of the platform. In this way, a subject may be rotated within the field of view of camera 131 to again capture multiple angles of a subject. By instantiating multiple activations of stepper motors 142 and 162 to reposition camera 131 about a subject on platform 152 a series of images can be captured which can be combined and used in an interactive display to exhibit a 3 dimensional view of a subject.

Furthermore, by setting the controller software to perform the activation of stepper motors 142 and 162 along with the remote activation of camera shutter 131. The time consuming and laborious process of multi-angle product photography can be automated.

Turning again to FIG. 6, there is shown a screenshot of an exemplary user interface for the software controller according to the present invention. The user interface depicts a subject rotation column 602, a camera rotation column 604, and a messages column 606. The subject rotation column 602 and camera rotation column displays information and provides the user with menus to input information regarding the rotation and position of the platform 152. The subject and camera rotation column includes; motor status 608, calibrate 610, define interval angle 612, transport 614, and position 616.

Motor status 608 indicates the motor status, particularly if the motor is attached and engaged as well as the acceleration and velocity limit for the motor rotations. Calibrate 610 allows the user to set a starting point for rotations by using the current position as well as setting the number of stops that will be made by the platform or camera mount. This provides the user with the ability to control the number of stops of the platform and camera, thus controlling the number of discreet images that can be captured of a subject for reconstruction into a single 3D image.

Define interval angle 612 provides the user with the ability to set, control and view the steps per interval, degrees per interval and the intervals per rotation. For example for a full 360 degree rotation, a user may set 180 intervals, with each interval having 2 degrees of rotation. Furthermore, the user may specify a number of steps per interval.

Transport 614 provides controls in the software user interface which allow the positioning of platform rotation and camera mount rotation by degrees, defined intervals, or steps of the stepper motor. These controls may be used for calibration, defining program start and end points, or general positioning. This control therefore provides the user with an alternate means for controlling the relative position of both the subject and image capture device.

Position 616 provides to the user an output reading of the current and target position for the platform or camera mount. The position can be provided for in degrees, intervals and stops. In this way the user may be apprised of the progress of an automated image capture session with respect to the degree of rotation, completed intervals and steps made.

Also depicted is the user interface for the auto program 620 capability according to the software of the present invention. In accordance with the auto program capability, a user may utilize the current invention to automatically take a series of images which can be combined into a 3D image set. For example, a user may place a subject on platform 152. Then in accordance with the auto program capabilities of the invention software may set a starting point, by selecting the initial markers, specify the subject rotation in terms of degrees, intervals and steps, and also the camera rotation with respect to the same parameters. Once the user has set all platform and camera rotation parameters, the user can select run 622 from the user interface. The auto program capability of the present invention will then automatically rotate the platform and camera through the pre-set rotation specified by the user. In addition, the auto program software includes the capability to instantiate the shutter release of the image capture device. As will be recognized by one skilled in the art, this can be accomplished by interfacing with the shutter release capability incorporated into modern digital cameras.

More specifically, The process of automation comprises steps which may include:

Calibration
1) Calibration of the platform rotation by capturing the number of rotations of the platform's stepper motor to a full rotation of the platter, or by entering a known value already measured.
2) Calibration of the camera mount rotation by capturing the number of rotations of the camera mount's stepper motor to 180 degrees rotation, or by entering a known value already measured.

Defining a Program
3) Defining a start and end point in degrees for the desired range of platform rotation. Known values may be entered, or the values may be captured by rotating the platform as desired and pressing the relevant start or end capture button in software.
4) Defining a start and end point in degrees for the desired range of camera mount rotation. Known values may be entered, or the values may be captured by rotating the camera mount as desired and pressing the relevant start or end capture button in software.
5) Defining intervals between images for platform rotation and camera mount rotation. These may be defined in degrees, number per total range, steps per stepper motor, or any similar calculations a user may find helpful.
6) Defining a safe time after camera image capture that will provide adequate time to ensure the camera has had time to capture the image.
7) Defining a safe time after apparatus positioning movement that will provide adequate time for the subject and apparatus to become still.

Running A Program: Once a program is defined, pressing the start button will start the program. If the current position is not the defined start position, the program will rotate the platform and/or camera mount to their defined start positions and software will announce that the program is ready to start from its start positions, which can begin by pressing the start button again. Upon starting the program from its start position, the software will trigger the camera. This can be done by triggering macro software that triggers the camera, or by triggering a relay switch to which the camera's electronic remote control is connected.

After the camera is triggered and the defined safe time after camera image capture has elapsed, the software will rotate the platform to the next interval. The stepper motor currently positioning either the platform or the camera mount will announce to the software when it has reached its target position. After the defined safe time after positioning movement has elapsed, the software may again trigger the camera.

If the last interval has been reached, the platform may return to its start position and the software will rotate the platform to its next interval. If the last interval for camera mount has been reached, the program will end.

Figure 1B:
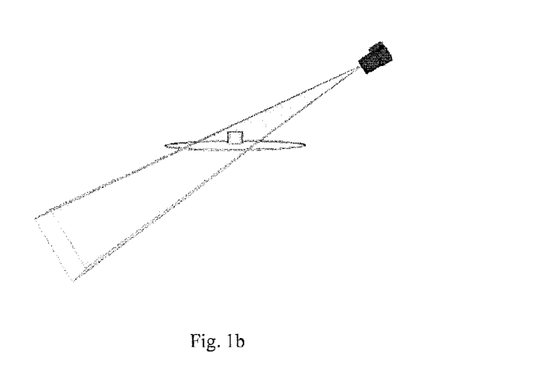
FIG. 1b is diagram depicting the usable image area positioning of the image capture device according to the present invention.
Figure 1C:
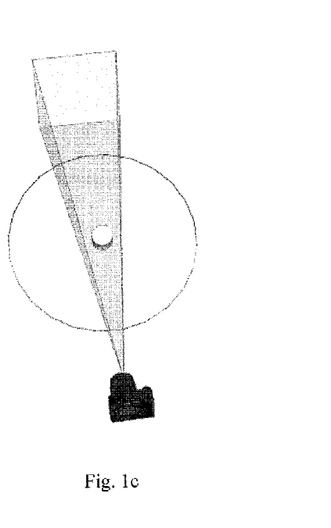
FIG. 1c is diagram depicting the usable image area positioning of the image capture device according to the present invention.
Figure 1D:
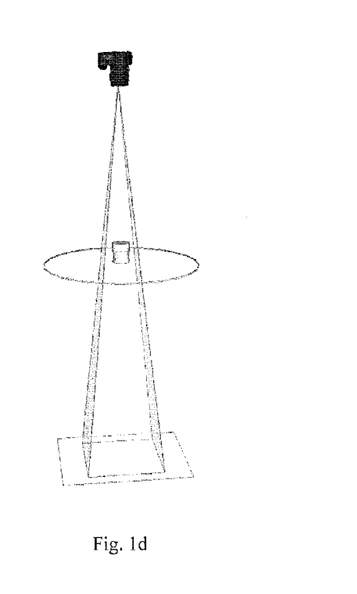
FIG. 1d is diagram depicting the usable image area positioning of the image capture device according to the present invention.

As previously described, platform 152 may be constructed of a transparent rigid surface. By forming the platform of a transparent material a "usable image area" may be defined within the camera's field of view by the physical support structure of the present invention that contains the subject and extends through the platform. FIGS. 1b, 1c and 1d show a subject centered on a transparent rotating platform. The subject is shown as a cylinder, representing a maximum height and width of the subject as it rotates on the platform.

A "usable image area" may be thought of as the area within the camera's view that comfortably fits the subject area. Ideally, a usable image area may be positioned within the camera field of view with no structural elements positioned in this area.

In an alternate embodiment and use of the present invention a background element may be placed within the usable image area opposite the subject from the camera. The background may be rotated with other elements of a lighting setup relative to the camera to maintain the appearance of a subject being lit from a single perspective.

FIG. 1d shows that a bird's-eye perspective introduces a practical limit for positioning the background element to approximately just above a floor. If a bird's-eye view is part of a desired range of images as the camera rotates around the subject, this will be a practical limit for the entire range.

A "safe zone" of an apparatus may be defined as a collection of usable image areas for a given subject and a given range of desired angles. Ideally, no static structural elements—such as those that support the platform—should be positioned within the safe zone, since these elements will interfere with the usable image area at some angles.

Note that any structural or lighting elements that are outside the usable image area and that move relative to the camera may be acceptable since they will not directly interfere with the usable image area at any angle as those elements move with the camera mount and therefore can not be within the camera field of view.

Figure 1E:
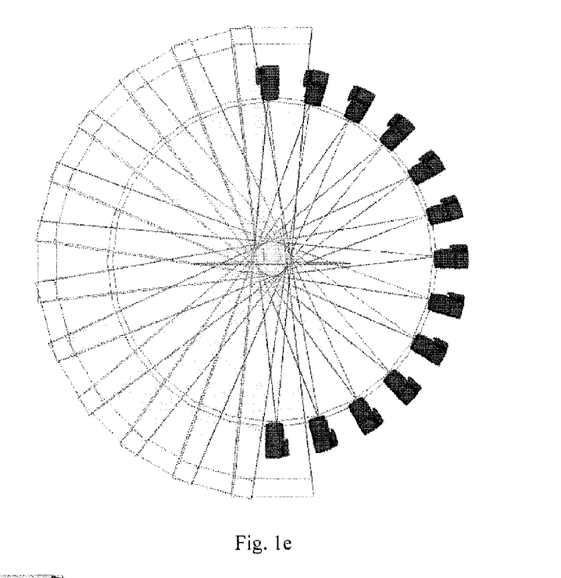
FIG. 1e is diagram depicting the safe zone positioning of the image capture device according to the present invention for various range of angles.
Figure 1F:
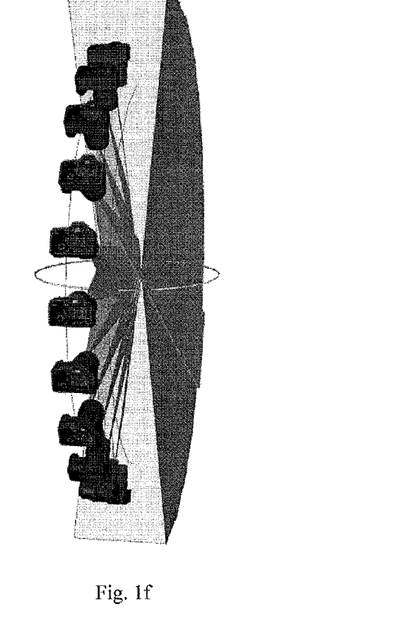
FIG. 1f is diagram depicting the safe zone positioning of the image capture device according to the present invention for various range of angles.
Figure 1G:
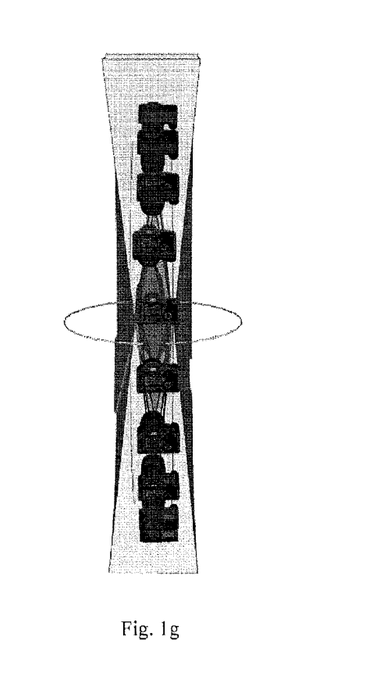
FIG. 1g is diagram depicting the safe zone positioning of the image capture device according to the present invention for various range of angles.

Diagrams 1e, 1f and 1g depict a range of angles from the top of the subject to the bottom (shooting up through the transparent platform). This is the minimum range of camera rotation that allows imaging from any angle of a subject on rotable platform 152. Note that for this range of angles, the safe zone completely divides the platform through its center. Thus the present invention rotatively supports the platform circumferentially at least outside the entire center area of the platform, in other words, outside of the safe zone.

Figure 1H:
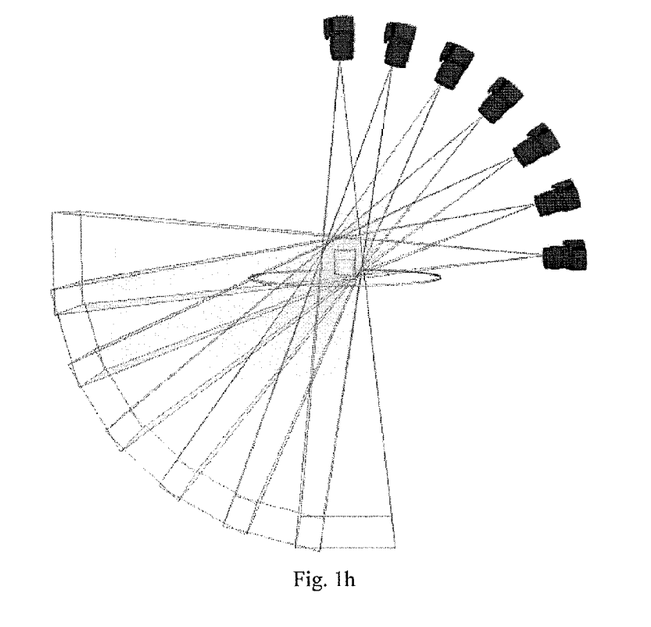
FIG. 1h is diagram depicting the safe zone positioning of the image capture device according to the present invention for various range of angles.
Figure 1I:
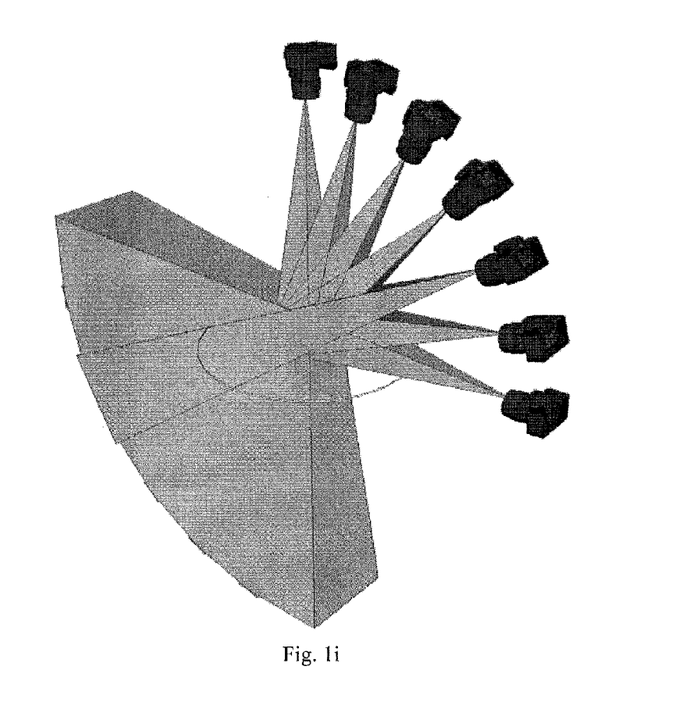
FIG. 1i is diagram depicting the safe zone positioning of the image capture device according to the present invention for various range of angles.

A partial range of angles is depicted in FIGS. 1h and 1i, showing a range of angles from the top of the subject to a horizontal perspective. This range (or even a subset of this range) may be acceptable for multi-imaging a particular subject. Note that this more limited range provides a smaller safe zone, most significantly excluding an area beneath the platform on the side of the camera. Therefore in an alternate embodiment of the present invention of a multi-imaging apparatus the apparatus may contain static structural elements in the area not within the field of camera view for the partial range of angles, while for angles outside this range, some static structural elements may be within the field of camera view. One alternate embodiment is based on a desired range from an angle parallel to the platform plane to the angle of the platform's rotational axis. This embodiment would allow static structural elements to be above the platform on the side opposite the camera and below the platform on the same side as the camera.

The fact that any usable image area necessarily includes the area directly under the subject dictates in accordance with the present invention that a structure rotatively supporting a non-opaque platform should do so outside of the safe zone field of view.

The safe zone will vary depending on factors such as the desired range of camera angles and the maximum height and width of an acceptably sized subject. In practice, the less unnecessary structure around the subject, the less likely this structure will objectionably impact the image by being visible in a reflective subject, or by adversely affecting the lighting setup, even when using an opaque platform.

Although specific embodiments were described herein, the scope of the invention is not limited to those specific embodiments. It will be appreciated by those skilled in the art that changes could be made to the embodiments described above without departing from the broad inventive concept thereof. In that regard features described herein may be used singularly or in combination as so desired. It is understood, therefore, that this invention is not limited to the particular embodiments disclosed, but it is intended to cover modifications within the spirit and scope of the present invention as defined by the appended claims and any equivalents thereof.

What is claimed is:

1. A support structure for holding and moving a subject for imaging with an image capture device having a field of view comprising:
    a platform having a center area for placement of the subject, a peripheral area and an axis about which the platform rotates; and
    a platform support structure for rotatively supporting the peripheral area of the platform, wherein the platform support structure is configured and arranged so that it does not substantially interfere with the imaging of the subject by appearing in the field of view of the image capture device when the subject is placed in the center area of the platform.

2. The support structure of claim 1, wherein the platform is circular.

3. The support structure of claim 1, wherein the platform is rotatable about its center point.

4. The support structure of claim 1, wherein the platform support structure supports the platform with at least one of the group consisting of rollers, roller bearings, ball bearings, belts, chains, timing belts, timing belt pulleys, tracks, treads, gears, sprockets, air pressure, and magnetic force.

5. The support structure of claim 1, wherein the platform is rotated by at least one of the group consisting of an electrically operated motor system and manual crank system.

6. The support structure of claim 1, further comprising a device mount assembly rotatable longitudinally about the platform, wherein the device mount supports at least one of the group consisting of the image capture device, a lighting system, a filter system, and a background set-up system.

7. The support structure of claim 1, wherein said platform is configured and adapted to translate at least one of vertically, horizontally, and diagonally.

8. The support structure of claim 1, further comprising a computer control system, wherein the computer control system controls at least one of rotation of the platform and the triggering of the image capture device.

9. The support structure of claim 1, further comprising a safe area defined by a plane through the platform's rotational axis wherein an image device position area is defined as the area above the platform on one side of the platform's rotational axis, and the safe area substantially excludes the area below the platform on a side of the image device position area and the area above the platform on a side opposite the image device position area.

10. The support structure of claim 1, wherein the platform is circular and comprises a grooved edge.

11. The support structure of claim 1, wherein the platform is transparent.

12. The support structure of claim 1, further comprising a background element placed opposite the subject from the image capture device and a lighting setup, wherein the background element and the lighting setup are configured such that they may be rotated relative to the image capture device to maintain the appearance of the subject being lit from a single perspective.

13. The support structure of claim 1, wherein the platform support structure rotatively drives the platform in the peripheral area.

14. The support structure of claim 6, wherein the device mount assembly is configured and adapted to rotate 360 degrees about the platform.

15. The support structure of claim 6, wherein the device mount assembly is configured and adapted to translate vertically.

16. The support structure of claim 6, wherein the device mount assembly is rotated by at least one of the group consisting of an electrically operated motor system and a manual crank system.

17. The support structure of claim 6, wherein the device mount comprises at least one pivoting arm, wherein the length of the at least one pivoting arm is variable by a telescoping mechanism.

18. The support structure of claim 6, further comprising a computer control system, wherein the computer control system controls at least one of the rotation of the device mount assembly, the rotation of the platform, and the triggering of the image capture device.

19. The support structure of claim 6, further comprising a safe area defined by a plane through the platform's rotational axis, wherein an image capture device with a field of view may be positioned throughout a range of angles within the safe area such that the platform support structure will not substantially interfere visually with the imaging of the subject by appearing in the field of view in front of or behind the subject, and wherein the safe area is substantially constrained within a range of positions of the image capture device and the background and any area outside the image capture device's field of view throughout the range of angles.

20. A support structure for holding and moving a subject for imaging with an image capture device comprising:
a platform having a center area for placement of the subject, a rotational axis and a peripheral area;
a camera positioning area defined as a plane through the rotational axis where the image capture device may be positioned; and
a platform support structure rotatively engaging the platform in its peripheral area outside an area defined by the intersection of the platform with the camera positioning area on at least one side of the rotational axis.

21. The support structure of claim 20, wherein the platform is transparent.

22. The support structure of claim 20, wherein the platform support structure rotatively drives the platform in the peripheral area.

23. A support structure for supporting a subject and an image capture device having a field of view comprising:
a transparent platform having a center area for placement of the subject, a rotational axis, and a peripheral area;
a platform support structure for supporting and rotatively engaging the peripheral area of the platform; and
a device mount assembly for supporting an image capture device,
wherein the support structure is configured and arranged to rotate at least one of the platform and device mount assembly about the rotational axis of the platform; and
wherein the support structure does not substantially interfere with the imaging of the subject by appearing in the field of view of the image capture device when the subject is placed in the center area of the platform.

24. The support structure of claim 23, wherein the device mount comprises at least one pivoting arm, the length of the at least one pivoting arm being variable by a telescoping mechanism.

25. The support structure of claim 23, wherein the device mount assembly is configured and adapted to rotate 360 degrees throughout a plane through the rotational axis of the platform.

26. The support structure of claim 23, wherein the support structure is configured and arranged to independently rotate the platform and the device mount about the rotational axis of the platform.

27. The support structure of claim 23, wherein the platform support structure rotatively drives the platform in the peripheral area.

28. The support structure of claim 24, wherein the device mount assembly is configured and adapted to rotate 360 degrees throughout a plane through the rotational axis of the platform.

* * * * *